April 23, 1935.  A. W. WHEATON  1,998,913

FAUCET

Filed June 28, 1933

INVENTOR
Abram W. Wheaton,
BY George D. Richards
ATTORNEY

Patented Apr. 23, 1935

1,998,913

UNITED STATES PATENT OFFICE 1,998,913

FAUCET

Abram W. Wheaton, Maplewood, N. J., assignor to A. W. Wheaton Brass Works, Newark, N. J., a corporation of New Jersey Application June 28, 1933, Serial No. 678,023

2 Claims. (Cl. 277—44)

This invention relates to improvements in faucets for discharging or dispensing the liquid content of tanks, tank-wagons, barrels and other containers desired to be equipped with a discharge faucet.

This invention has for its principal object to provide an improved construction of self-closing faucet for the described purposes having detachable key or wrench means for actuating the valve thereof, and in which the valve means per se is provided with means to prevent chattering, hammering or sudden back pressure during closing movements thereof.

This invention has for a further object to provide a compact and simplified form and construction of faucet wherein a valve chamber is formed at and within the butt end of the faucet with the valve guiding and closing means housed entirely within said valve chamber, thereby providing a faucet of very compact form in which externally projecting guide housings are eliminated, with the consequence that a faucet of comparatively small bulk and simple exterior design is furnished.

Other objects of this invention, not at this time more particularly enumerated, will be clearly understood from the following detailed description of the same.

An illustrative embodiment of this invention is shown in the accompanying drawing, in which:—

Figure 1:
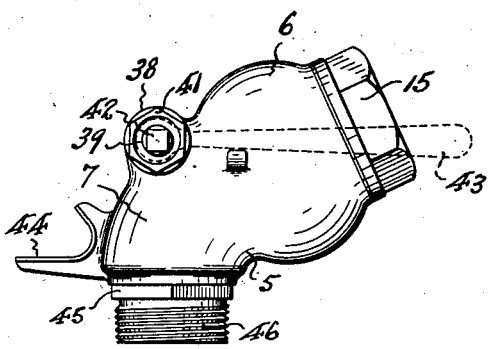
Figure 3:
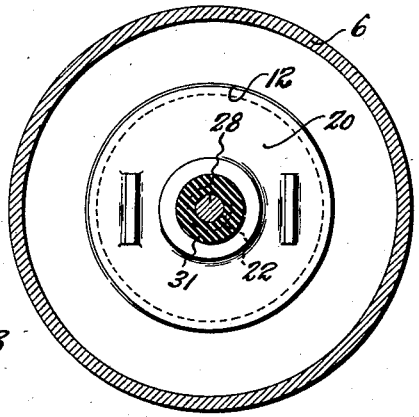
Figure 4:
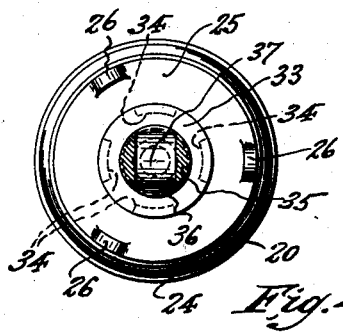
Figure 2:
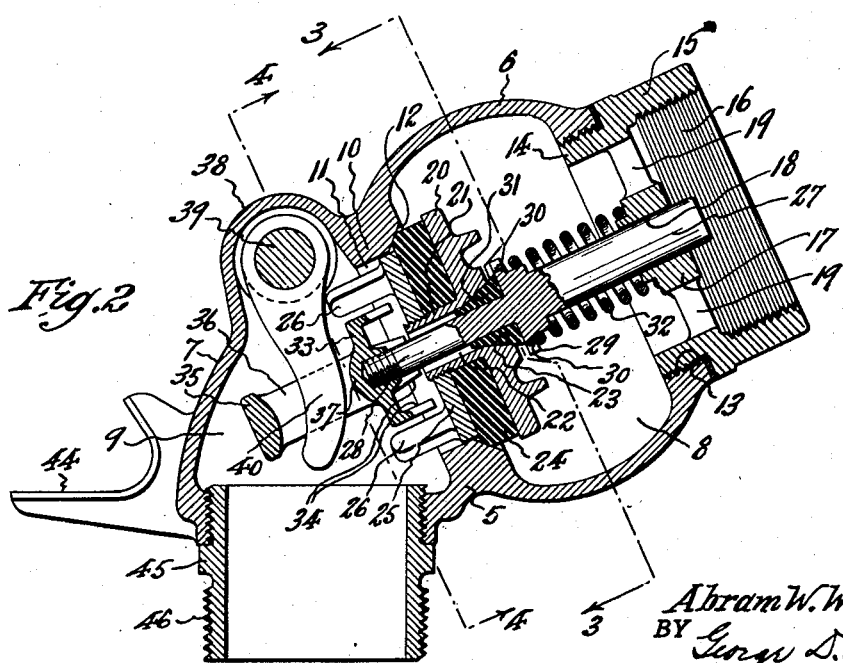

Fig. 1 is a side elevation of a faucet made according to this invention; Fig. 2 is a vertical longitudinal section of the same, drawn on an enlarged scale; Fig. 3 is a transverse section, taken on line 3—3 in Fig. 2; and Fig. 4 is a fragmentary transverse sectional view, taken on line 4—4 in Fig. 2, but showing the valve means only.

Similar characters of reference are employed in the above-described views, to indicate corresponding parts.

Referring to said drawing, the reference character 5 indicates the faucet body as a whole, the same comprising, at its butt end, a substantially globular valve housing 6 which terminates at its outer end in a downwardly curved discharge spout 7. The interior of said housing 6 provides a valve chamber 8, across the lower end of which, and intermediate the same and the passage 9 of said spout, is a transverse partition 10 provided with a central primary valve port 11, the upper margin of which is chamfered to form a valve-seat 12. At its outer end, said valve housing 6 is provided with an internally threaded opening 13 to receive the externally threaded stub 14 of a union or coupling member 15 which, at its outer end, is internally threaded, as at 16, to receive a nipple connection (not shown) for connecting the faucet to the body of a tank, barrel or other container or conduit leading from a source of liquid supply to be dispensed through the faucet. Within said union or coupling member 15, intermediate its ends, is a centrally disposed guide piece 17 having a bore 18 axially aligned with the valve port 11. This guide-piece 17 is supported by radial spider arms 19 extending between the same and the walls of said union or coupling member.

The reference character 20 indicates a primary or main valve member or disc, the same having at its under side a centrally located downwardly projecting stub 21 having an axial bore providing a secondary valve port 22, the upper margin of which is chamfered to form a secondary valve seat 23. Lower side of said primary or main valve member or disc 20 is provided with a more or less resilient valve-facing or valve washer 24. Threaded on the lower extremity of said stub 21 is a combined keeper and guide disc 25 which abuts said facing or washer 24 to retain the same in operative assembled relation to the main valve member or disc 20, and which slidingly enters the primary valve port 11. Depending from the marginal portions of said disc 25 are circumferentially spaced guide-fingers 26 which slidingly engage the sides of said primary valve port 11 so as to guide the movements of said main valve member or disc 20 to maintain the same aligned with the valve port 11.

The reference character 27 indicates a guide stem which is slidably engaged at its upper end through the bore 18 of said guide piece 17. At the lower end of said stem 27, and preferably integral therewith, is a depending shank 28 of reduced diameter which extends downwardly through the secondary valve port 22. This shank 28 is of substantially less diameter than that of said secondary valve port 22, so as to leave an unobstructed passage around the same for liquid movement through said secondary valve port 22, when the latter is opened. Intermediate the stem 27 and shank 28, and at a point spaced somewhat from the upper face of said main or primary valve member or disc 20, there is provided a laterally projecting annular flange 29, the periphery of which is preferably notched at spaced circumferential intervals to provide liquid clearance spaces or openings 30. Beneath said flange 29 and surrounding the upper portion of said shank 28 is a secondary valve washer 31, preferably of conical or tapered form, as shown; the same normally engaging said secondary valve seat 23, so as to close said secondary valve port 22. Arranged around said stem 27 between said guide piece 17 and said flange 29 is a compression spring 32 which serves to yieldably close both said primary and secondary valve structures.

Said shank 28 projects beyond the extremity of said secondary valve port 22, and is provided with an externally threaded end to receive a thrust piece 33 provided with upwardly projecting circumferentially spaced thrust fingers 34 adapted to be moved with said thrust piece into lifting or opening engagement with the underside of the primary valve structure. Owing to the spaced relation of said thrust fingers 34 passage of any liquid around said thrust piece, permitted to flow outwardly through said secondary valve port 22, is unobstructed. Connected with the underside of said thrust piece 33, preferably as an integral part thereof, is a yoke-piece 35 having a transverse slotted opening 36 therethrough, at the upper end of which is a curved bearing or thrust boss 37.

Journaled in a bearing housing 38, integrally formed at the upper exterior side of said spout 7, and which is closed at one end, is a transverse spindle 39 to which is secured a cam lever 40, adapted to project into the interior of said spout, with its free end operatively engaged through the slotted opening 36 of said yoke-piece 35. Said spindle 39 projects exteriorly from the open end of said bearing housing 38, through a stuffing box nut 41. The exterior end of said spindle 39 is provided with a squared end 42 to detachably receive connection of a valve actuating wrench or key 43, shown in dotted outline in Fig. 1.

Integrally formed for external projection from the front side of said spout 7 is a hook or rest 44 engageable by the bail of a portable can or receptacle (not shown) into which liquid is to be dispensed from the faucet.

Connected with the free end of said spout is a coupling nipple 45 having an externally threaded free end 46, whereby a hose or like conduit may be connected to the faucet when desired.

To operate the faucet, the wrench 43 is applied to the squared end of the spindle 39, whereby the latter may be turned anti-clockwise. Such movement of the spindle swings upwardly the cam lever 40 within the yoke-piece 35 so as to move the free end of said cam lever with lifting pressure against the thrust boss 37, thus imparting upward movement to the thrust piece 33 whereby the shank 28 and stem 27 are moved longitudinally upward. This movement of shank 28 and stem 27 displaces the secondary valve washer 31 from the seat 23, thus opening the secondary valve port 22, whereupon the thrust fingers 34 of the thrust-piece 33 engage with the underside of the primary valve structure, so that continued upward movement of the cam lever causes the primary valve structure to rise from the valve seat 12 thus opening the primary valve port 11 to the downward flow of liquid through the faucet for discharge from the spout 7. These valve movements serve to compress the spring 32.

When it is desired to close the faucet, to shut off liquid flow therethrough, valve opening pressure on the wrench 43 is relaxed so as to cause the cam lever to swing back toward normal initial position, thus releasing the primary valve structure from lifting pressure so that dynamic pressure of the flowing liquid moves the latter back to closed relation to the main or primary valve port 11. This occurs before the secondary valve washer 31 moves to normal closed position under the pressure of the spring 32, and consequently after the main valve structure closes, there is still a diminished flow of liquid through the secondary valve port 22 which is gradually reduced as the conical secondary valve washer 31 approaches the seat 23 of said secondary valve port 22, until finally said secondary valve washer engages said seat and thereby closes said secondary valve port 22 to completely shut off the faucet. Owing to this diminishing flow of liquid through the secondary valve port after the main valve port is closed, all tendency of valve chattering, hammering or the creation of sudden back pressures is eliminated.

It will be observed that due to the provision of the globular valve housing at the butt end of the faucet, that the valve guide means is entirely contained within the faucet body, and that all external and unsightly projections and extra housing chambers heretofore used in connection with such faucets are eliminated, and consequently a much less bulky and more sightly faucet is furnished.

As many changes could be made in the above described construction and many apparently widely different embodiments of this invention could be made without departing from the scope thereof, it is intended that all matter contained in the above description or shown in the accompanying drawing shall be interpreted as illustrative and not in a limiting sense.

I claim:—

1. A faucet comprising a globular valve housing having an elbow-like discharge spout integral with its outer end and a primary valve port across the juncture of said housing and spout, a primary valve having a secondary valve port, a secondary valve cooperative with said latter port, an upwardly extending stem connected with said secondary valve, a union member detachably connected with the intake end of said housing, said union member having a guide piece through which said stem slides, spring means around stem between said secondary valve and said guide piece operative to yieldably close both valves, a downwardly extending shank connected with said secondary valve, a thrust piece on said shank having upwardly projecting fingers laterally offset from the shank and normally spaced below said primary valve, said elbow-like discharge spout having a transverse bearing housing offset from its major curved side, a spindle journaled in said housing, said spindle having an externally projected end portion to receive application of a faucet actuating tool, and a cam on said spindle movable thereby within the interior of said spout to operatively engage said valve actuating thrust-piece.

2. A faucet as defined in claim 1, wherein said primary valve is provided with circumferentially spaced guide fingers slidably dependent therefrom through said primary valve port.

ABRAM W. WHEATON.